(12) United States Patent
Chen (10) Patent No.: US 12,451,020 B2
(45) Date of Patent: Oct. 21, 2025

(54) METHOD, APPARATUS AND NON-TRANSITORY COMPUTER-READABLE STORAGE MEDIUM FOR FLIGHT ROUTE PLANNING FOR AERIAL VEHICLE

(71) Applicant: Wistron Corporation, New Taipei (TW)

(72) Inventor: Shao-Kang Chen, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 141 days.

(21) Appl. No.: 18/498,281

(22) Filed: Oct. 31, 2023

(65) Prior Publication Data

US 2025/0046199 A1 Feb. 6, 2025

(30) Foreign Application Priority Data

Aug. 2, 2023 (TW) .................................. 112129161

(51) Int. Cl.
*G08G 5/55* (2025.01)
*G08G 5/22* (2025.01)
(Continued)

(52) U.S. Cl.
CPC ................. *G08G 5/55* (2025.01); *G08G 5/22* (2025.01); *G08G 5/26* (2025.01); *G08G 5/32* (2025.01); *G08G 5/57* (2025.01)

(58) Field of Classification Search
CPC .. G08G 5/55; G08G 5/22; G08G 5/26; G08G 5/32; G08G 5/57; G08G 5/34; G08G 5/59; G01C 21/20
See application file for complete search history.

(56) References Cited

U.S. PATENT DOCUMENTS

| | | | | |
|---|---|---|---|---|
| 4,792,906 A | * | 12/1988 | King | G05D 1/0653 701/5 |
| 6,262,679 B1 | * | 7/2001 | Tran | G08G 5/53 342/36 |

(Continued)

FOREIGN PATENT DOCUMENTS

| | | | | |
|---|---|---|---|---|
| CA | 2789699 A1 | * | 9/2011 | ......... G01C 21/3492 |
| CA | 2996844 A1 | * | 6/2016 | ............ H04W 36/12 |

(Continued)

OTHER PUBLICATIONS

"Research on urban application-oriented route planning of UAV based on mobile communication network;" Zhu et al.; 2015 4th International Conference on Computer Science and Network Technology (ICCSNT) (vol. 01, 2015, pp. 1562-1570); Dec. 1, 2015. (Year: 2015).*

(Continued)

*Primary Examiner* — Bao Long T Nguyen
*Assistant Examiner* — Jorge O Peche
(74) *Attorney, Agent, or Firm* — McClure, Qualey & Rodack, LLP (57) ABSTRACT

A method, an apparatus and a non-transitory computer-readable storage medium for flight route planning for an aerial vehicle are provided, which generates a plurality of flight routes based on a starting position, an ending position, a total mileage limit, and a minimum network coverage rate. A feature score is given to the total mileage and the network coverage rate of each flight route. A total score is then calculated by using a mathematical relationship between the feature scores for total mileage and network coverage rate. The flight route with the highest total score is determined as the optimal flight route.

20 Claims, 5 Drawing Sheets

(51) Int. Cl.
*G08G 5/26* (2025.01)
*G08G 5/32* (2025.01)
*G08G 5/57* (2025.01)

(56) References Cited

U.S. PATENT DOCUMENTS

| | | | | |
|---|---|---|---|---|
| 6,400,690 | B1* | 6/2002 | Liu | H04W 24/00 |
| | | | | 370/332 |
| 7,194,353 | B1* | 3/2007 | Baldwin | G09B 9/003 |
| | | | | 701/528 |
| 7,359,703 | B2* | 4/2008 | McGuffin | G08G 5/26 |
| | | | | 455/442 |
| 7,493,196 | B2* | 2/2009 | Caillaud | G08G 5/53 |
| | | | | 701/4 |
| 7,684,820 | B2* | 3/2010 | McGuffin | H04B 7/18506 |
| | | | | 455/431 |
| 8,082,102 | B2* | 12/2011 | Ravenscroft | G08G 5/55 |
| | | | | 701/2 |
| 8,515,609 | B2* | 8/2013 | McAndrew | G05D 1/0088 |
| | | | | 244/76 R |
| 8,594,932 | B2* | 11/2013 | McIver | G01C 23/00 |
| | | | | 701/4 |
| 8,606,266 | B1* | 12/2013 | Mitchell | H04B 7/18508 |
| | | | | 709/227 |
| 8,606,458 | B2* | 12/2013 | Hu | G01C 21/3667 |
| | | | | 701/33.4 |
| 8,626,361 | B2* | 1/2014 | Gerlock | G08G 5/55 |
| | | | | 701/13 |
| 8,670,930 | B1* | 3/2014 | Denise | G01C 21/3415 |
| | | | | 701/417 |
| 8,838,804 | B2* | 9/2014 | Beachem | G06F 21/57 |
| | | | | 709/227 |
| 8,948,932 | B2* | 2/2015 | Yeager | G05D 1/0022 |
| | | | | 701/3 |
| 9,292,913 | B2* | 3/2016 | Schultz | G06T 7/521 |
| 9,508,263 | B1* | 11/2016 | Teng | G05D 1/0094 |
| 9,654,200 | B2* | 5/2017 | Mazzarella | H04L 63/0428 |
| 9,881,022 | B2* | 1/2018 | Ubhi | G08G 5/32 |
| 10,096,038 | B2* | 10/2018 | Ramirez | G06Q 50/40 |
| 10,150,524 | B2* | 12/2018 | Evans | G05D 1/0027 |
| 10,429,839 | B2* | 10/2019 | Liu | G05D 1/652 |
| 10,859,670 | B2* | 12/2020 | Chu | G08G 1/123 |
| 10,977,949 | B2* | 4/2021 | Ubhi | G08G 5/55 |
| 11,062,614 | B2* | 7/2021 | Campbell | G08G 5/22 |
| 11,696,367 | B2* | 7/2023 | Verzun | H04L 63/18 |
| | | | | 713/154 |
| 11,866,167 | B2* | 1/2024 | Youmans | G06V 20/176 |
| 11,991,788 | B2* | 5/2024 | Verzun | H04W 4/06 |
| 12,094,349 | B2* | 9/2024 | Vining | G06N 20/00 |
| 2002/0029108 | A1* | 3/2002 | Liu | G01C 21/26 |
| | | | | 701/410 |
| 2010/0070124 | A1* | 3/2010 | Yeager | G05D 1/0022 |
| | | | | 701/25 |
| 2012/0065881 | A1* | 3/2012 | McIver | G05D 1/0088 |
| | | | | 701/467 |
| 2012/0101717 | A1* | 4/2012 | Zhang | G01C 21/20 |
| | | | | 701/409 |
| 2013/0248656 | A1* | 9/2013 | Mohamadi | H04W 72/046 |
| | | | | 244/190 |
| 2014/0095070 | A1* | 4/2014 | Hu | G01C 21/34 |
| | | | | 701/527 |
| 2015/0221079 | A1* | 8/2015 | Schultz | G01S 7/4808 |
| | | | | 382/190 |
| 2015/0276697 | A1* | 10/2015 | Hufschlag | G01N 33/0062 |
| | | | | 702/24 |
| 2015/0323930 | A1* | 11/2015 | Downey | G05D 1/692 |
| | | | | 701/14 |
| 2016/0219024 | A1* | 7/2016 | Verzun | H04L 9/34 |
| 2016/0236790 | A1* | 8/2016 | Knapp | B64C 11/001 |
| 2016/0275801 | A1* | 9/2016 | Kopardekar | G08G 5/55 |
| 2016/0300493 | A1* | 10/2016 | Ubhi | G08G 5/76 |
| 2016/0350927 | A1* | 12/2016 | Ma | G01C 21/30 |
| 2017/0029107 | A1* | 2/2017 | Emami | G05D 1/0033 |
| 2017/0200378 | A1* | 7/2017 | Smothers | G01N 30/12 |
| 2017/0337219 | A1* | 11/2017 | Ubhi | G08G 5/727 |
| 2017/0337824 | A1* | 11/2017 | Chen | G05D 1/0202 |
| 2018/0109399 | A1* | 4/2018 | Cardoso de Moura | |
| | | | | H04W 88/06 |
| 2018/0136647 | A1* | 5/2018 | Gurdan | G08G 5/56 |
| 2018/0237086 | A1* | 8/2018 | Evans | B60P 3/423 |
| 2018/0239991 | A1* | 8/2018 | Weller | G06F 16/907 |
| 2018/0341880 | A1* | 11/2018 | Kislovskiy | G06Q 10/02 |
| 2018/0341895 | A1* | 11/2018 | Kislovskiy | G06Q 10/06313 |
| 2018/0359811 | A1* | 12/2018 | Verzun | H04L 12/28 |
| 2018/0375568 | A1* | 12/2018 | De Rosa | G08G 5/34 |
| 2019/0041233 | A1* | 2/2019 | Duerksen | G01C 23/00 |
| 2019/0080142 | A1* | 3/2019 | Abeywardena | G01C 21/3852 |
| 2019/0096269 | A1* | 3/2019 | Sidiropoulos | G08G 5/56 |
| 2019/0265705 | A1* | 8/2019 | Zhang | G05D 1/644 |
| 2020/0050200 | A1* | 2/2020 | Torii | B64D 27/24 |
| 2020/0126427 | A1* | 4/2020 | Civitella | G01C 21/30 |
| 2020/0135036 | A1* | 4/2020 | Campbell | G06T 11/206 |
| 2020/0290742 | A1* | 9/2020 | Kumar | B64D 27/10 |
| 2021/0014939 | A1* | 1/2021 | Verzun | H04L 12/28 |
| 2021/0020050 | A1* | 1/2021 | Iezzi | G08G 5/22 |
| 2021/0097869 | A1* | 4/2021 | Piradi | G08G 5/53 |
| 2021/0304625 | A1* | 9/2021 | Ali | G08G 5/22 |
| 2021/0304626 | A1* | 9/2021 | Ubhi | G08G 5/34 |
| 2021/0319394 | A1* | 10/2021 | Tazume | G06Q 10/08 |
| 2021/0343168 | A1* | 11/2021 | Campbell | G08G 5/26 |
| 2021/0404832 | A1* | 12/2021 | Baig | G01C 21/3415 |
| 2023/0254944 | A1* | 8/2023 | Verzun | H04W 28/12 |
| | | | | 713/154 |
| 2024/0133693 | A1* | 4/2024 | Ali | G08G 5/55 |
| 2024/0370026 | A1* | 11/2024 | Katsumata | G05D 1/82 |
| 2025/0046199 | A1* | 2/2025 | Chen | G08G 5/26 |

FOREIGN PATENT DOCUMENTS

| | | | | |
|---|---|---|---|---|
| CN | 107211287 | A * | 9/2017 | B64C 11/001 |
| CN | 110673481 | A * | 1/2020 | G05B 13/042 |
| CN | 112365707 | A * | 2/2021 | G06Q 10/06393 |
| CN | 108270476 | B * | 7/2021 | H04B 7/18502 |
| CN | 112365707 | B | 8/2022 | |
| CN | 116868142 | A * | 10/2023 | G06T 7/12 |
| CN | 118424280 | A * | 8/2024 | |
| DE | 102007032084 | A1 * | 1/2009 | G01S 13/933 |
| EP | 3147887 | A1 * | 3/2017 | G01S 13/87 |
| EP | 3208573 | A1 * | 8/2017 | G01C 21/16 |
| EP | 3979160 | A1 * | 4/2022 | G06Q 10/06315 |
| KR | 101806053 | B1 * | 1/2018 | B64C 39/024 |
| WO | WO-2018006454 | A1 * | 1/2018 | G05D 1/46 |
| WO | WO-2021032830 | A1 * | 2/2021 | G01C 21/20 |

OTHER PUBLICATIONS

"Machine-Learning-Aided Trajectory Prediction and Conflict Detection for Internet of Aerial Vehicles;" Cheng et al., IEEE Internet of Things Journal (vol. 9, Issue: 8, 2022, pp. 5882-5894); Apr. 15, 2022. (Year: 2022).*

"Trajectories and Resource Management of Flying Base Stations for C-V2X;" Mignardi et al., Sensors (Basel, Switzerland), 19(4), 811; Feb. 16, 2019. (Year: 2019).*

Examination report dated Apr. 25, 2024, listed in related Taiwan patent application No. 112129161.

* cited by examiner

METHOD, APPARATUS AND NON-TRANSITORY COMPUTER-READABLE STORAGE MEDIUM FOR FLIGHT ROUTE PLANNING FOR AERIAL VEHICLE

CROSS-REFERENCE TO RELATED APPLICATION

This non-provisional application claims priority under 35 U.S.C. § 119 (a) to patent application No. 112129161 filed in Taiwan, R.O.C. on Aug. 2, 2023, the entire contents of which are hereby incorporated by reference.

BACKGROUND

Technical Field

The present disclosure relates to a route planning technology, and in particular, to a method, an apparatus and a non-transitory computer-readable storage medium for flight route planning for an aerial vehicle, which are applicable to aerial vehicles and capable of selecting the flight route according to network communication quality.

Related Art

Flight routes of existing aerial vehicles such as unmanned aerial vehicles are usually planned by software, and the flight routes are planned based on ideal conditions such as good weather, good GPS signals, and good network communication, so as to make plans for the shortest route. However, such planning is often overly optimistic because the shortest route does not necessarily have good network coverage. If the unmanned aerial vehicle encounters poor network communication during flight, it is prone to interruptions in data or command transmission, and the unmanned aerial vehicle may even deviate from its flight route.

If the unmanned aerial vehicle deviates from its flight route and there is no stable network signal to send back real-time images and flight information, an operator or control center will not be able to deal with the situation in real time, which may easily lead to accidents of the unmanned aerial vehicle.

SUMMARY

In view of this, embodiments of the present disclosure provide a method, an apparatus and a non-transitory computer-readable storage medium for flight route planning for an aerial vehicle capable of selecting the flight route according to network communication quality.

An embodiment of the present disclosure provides a method for flight route planning for an aerial vehicle, which includes (but is not limited to) the following steps: receiving a request including a starting position and an ending position; using flight geographic data to generate a plurality of flight routes; calculating a total mileage and a network coverage rate of each of the flight routes, assigning a feature score to the total mileage and the network coverage rate of each of the flight routes respectively, and calculating a total score of each of the flight routes by using a mathematical relationship between the feature scores for the total mileage and the network coverage rate; and outputting an optimal flight route as a preset flight route of the aerial vehicle, the optimal flight route is the flight route with the highest total score selected from all the flight routes.

An embodiment of the present disclosure provides an apparatus for flight route planning for an aerial vehicle, which can provide an optimal flight route to an unmanned aerial vehicle. The apparatus includes (but is not limited to) a wireless communication module, a storage module, and a processor. The wireless communication module is configured to be communicatively coupled to the aerial vehicle. The storage module is configured to store the flight geographic data. The processor is electrically coupled to the wireless communication module and the storage module, and configured to execute instructions to perform operations in the foregoing method.

An embodiment of the present disclosure provides a non-transitory computer-readable storage medium, which stores instructions. The instructions, when executed by a processor, cause the processor to perform the foregoing method.

Based on the above, the method, the apparatus and the non-transitory computer-readable storage medium for flight route planning for an unmanned aerial vehicle according to some embodiments can automatically generate an optimal flight route based on various considerations, such as flight distance limitations, network coverage rate limitations, avoidance of network congestion areas, avoidance of no-fly areas, or avoidance of actual poor network quality areas.

DETAILED DESCRIPTION

Figure 1:
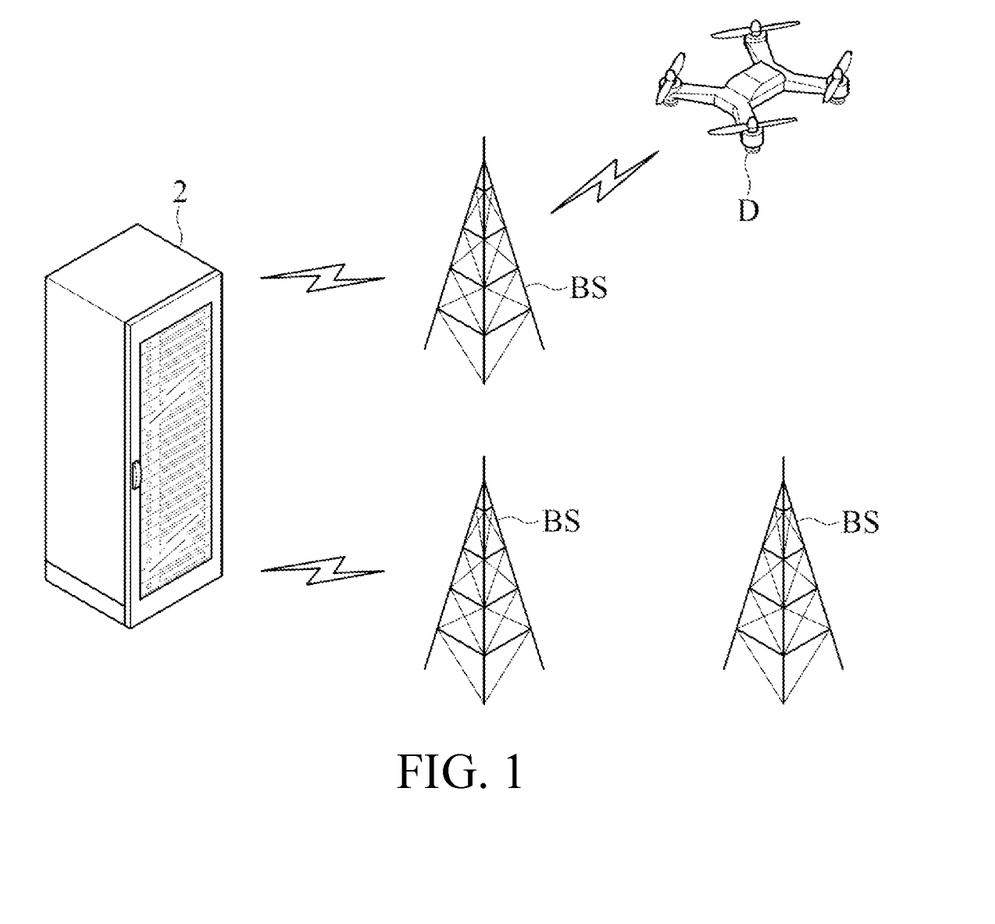
FIG. 1 is a schematic diagram of a network according to an embodiment of the present disclosure.

An aerial vehicle of the present disclosure is described by taking an unmanned aerial vehicle as an example. Referring to FIG. 1 firstly, which is a schematic diagram of a network according to an embodiment of the present disclosure, and shows communication between an unmanned aerial vehicle D during flight and an apparatus 2 for flight route planning for an unmanned aerial vehicle via base stations BS. The base station BS may be a mobile communication network base station, and the mobile communication network may include at least one of Third Generation (3G), Fourth Generation (4G), Long Term Evolution (LTE), 5G NR (New Radio), Time Division Multiple Access (TDMA), Code Division Multiple Access (CDMA), CDMA 2000, Wideband CDMA (WCDMA), Global System for Mobile Communication (GSM), Single-Carrier Radio Transmission Technology (1×RTT), and Universal Mobile Telecommunication System (UMTS).

Figure 2:
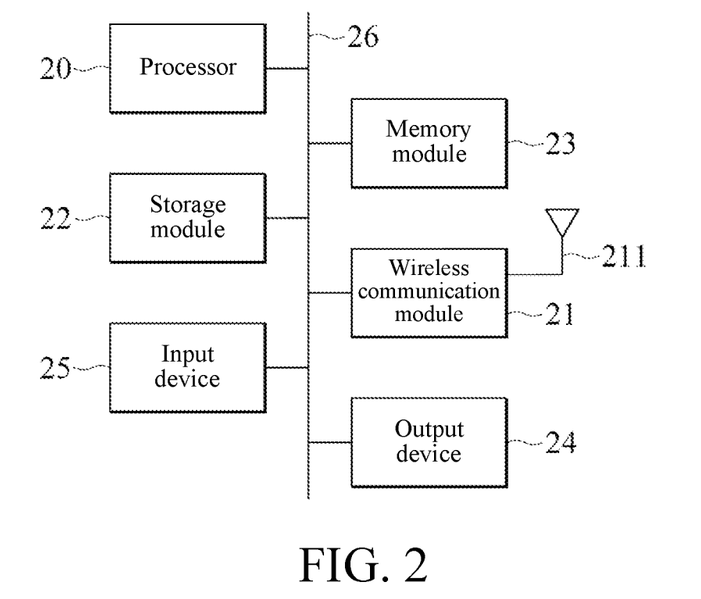
FIG. 2 is a system architecture diagram of an apparatus for flight route planning for an aerial vehicle according to an embodiment of the present disclosure.

Referring to FIG. 2, which is a system architecture diagram of an apparatus for flight route planning for an unmanned aerial vehicle according to an embodiment of the present disclosure. As shown in the figure, the apparatus 2 for flight route planning for an unmanned aerial vehicle includes a processor 20, a wireless communication module 21, a storage module 22, a memory module 23, an output device 24, and an input device 25, which are electrically coupled to each other through a bus 26. In one embodiment, the apparatus 2 for flight route planning for an unmanned aerial vehicle may be a dedicated machine for unmanned aerial vehicle control, a desktop computer, a laptop computer, a notebook computer, a phablet, a handheld computing apparatus, a mainframe computer, a supercomputer, a workstation, or a server.

The processor 20 may include (but is not limited to) one or more general-purpose processors, one or more special-purpose processors (such as digital signal processing chips, graphics accelerators, application-specific integrated circuits (ASIC), or other equivalent chips or components), or other processing structures or elements configured to execute one or more of the methods described herein.

The wireless communication module 21 may be communicatively connected to the unmanned aerial vehicle D directly, or communicatively connected to the unmanned aerial vehicle D through a base station BS. The wireless communication module 21 may include (but is not limited to) a modem, a network card, an infrared communication device, a wireless communication device, and/or a chipset (such as a Bluetooth device, an IEEE 802.11 device, an IEEE 802.15.4 device, a WiFi device, a WiMax device, a cellular communication facility, etc.) or other equivalent components. Moreover, the wireless communication module 21 may also carry out communication via one or more wireless communication antennas 211 used for transmitting and receiving wireless signals.

The storage module 22 is configured to store flight geographic data, program codes, instructions, operating systems, and related software. The software may include methods provided by embodiments described herein or configure systems provided by other embodiments. The flight geographic data includes latitude and longitude coordinates, a terrain data, and a network coverage data. The terrain data includes information on natural terrain, man-made terrain, buildings, etc., combine coordinates and elevation data. The network coverage data consists of information regarding the quality and distribution of network connectivity for various mobile broadband systems, such as 5G NR or 4G LTE, provided by different telecommunications operators in different geographical areas. The storage module 22 may be any available medium that can be accessed by a computer, such as (but is not limited to) a compact disc read-only memory (CD-ROM) or other optical disk storage, magnetic disk storage, semiconductor storage or other storage device, or other media that can be used for storing program codes in the form of instructions or data structures and can be accessed by a computer.

The memory module 23 may include (but is not limited to) a random access memory (RAM), a dynamic RAM (DRAM), a static RAM (SRAM), a read-only memory (ROM), an electrically erasable programmable ROM (EEPROM), or other types of non-transitory computer-readable storage media. The output device 24 may include (but is not limited to) a display, a printer, LEDs, a speaker or the like. The input device 25 may include (but is not limited to) a camera, a touchscreen, a touchpad, a microphone, a keyboard, a mouse, a button, a dial, a switch or the like.

Figure 3:
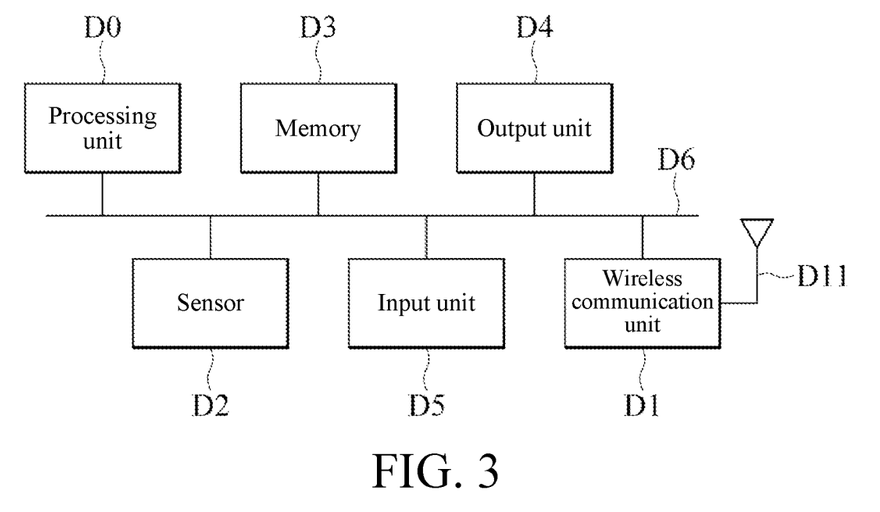
FIG. 3 is a system architecture diagram of an aerial vehicle according to an embodiment of the present disclosure.

Referring to FIG. 3, which is a system architecture diagram of an unmanned aerial vehicle according to an embodiment of the present disclosure. The unmanned aerial vehicle D includes a processing unit D0, a wireless communication unit D1, a sensor D2, a memory D3, an output unit D4, and an input unit D5, which are electrically coupled to each other through a bus unit D6. The processing unit D0 is configured to monitor and control various functions, subsystems, and other components of the unmanned aerial vehicle D, such as any combination of modules, software, instructions, circuits, hardware and the like related to propulsion, navigation, power management, sensor management, stability management, etc.

The wireless communication unit D1 may be communicatively connected to the apparatus 2 for flight route planning for an unmanned aerial vehicle directly, or communicatively connected to the apparatus 2 for flight route planning for an unmanned aerial vehicle through a base station BS. The wireless communication unit D1 may include (but is not limited to) a wireless communication device or a chipset (such as a Bluetooth device, an IEEE 802.11 device, an IEEE 802.15.4 device, a WiFi device, a WiMax device, a cellular communication facility, etc.) or other equivalent components. Moreover, the wireless communication unit D1 can communicate by sending and receiving wireless signals through one or more wireless communication antennas D11.

The sensor D2 may include (but is not limited to) an image sensor, an altimeter, an anemometer, a gyroscope, a barometer, an accelerometer, a proximity sensor, a light sensor, an electronic compass, a satellite positioning system receiver, and a network quality detector.

The memory D3 may include (but is not limited to) a local and network accessible storage, a disk drive, a drive array, an optical storage device, a solid-state storage device (such as a random access memory (RAM) and/or a read-only memory (ROM)) or the like. Such storage devices may be configured to implement any suitable data storage, including (but not limited to) various file systems, database structures or the like.

The output unit D4 may include (but is not limited to) a display, a light-emitting diode (LED), a speaker, or other equivalent components. The input unit D5 may be used to receive control commands (e.g., flight route change, activating the camera, etc.) or data from the apparatus 2 for flight route planning for an unmanned aerial vehicle, and collecting data of various conditions related to the unmanned aerial vehicle D, such as collecting various environmental data through the sensor D2. Moreover, the output unit may also include a screen, a touchpad, a microphone, a switch or similar devices.

Figure 4:
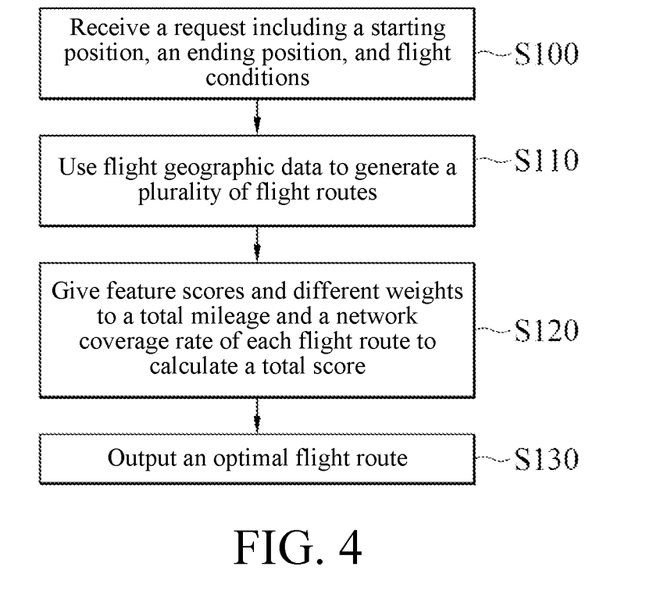
FIG. 4 is a flowchart of a method for providing an optimal flight route according to an embodiment of the present disclosure.
Figure 5:
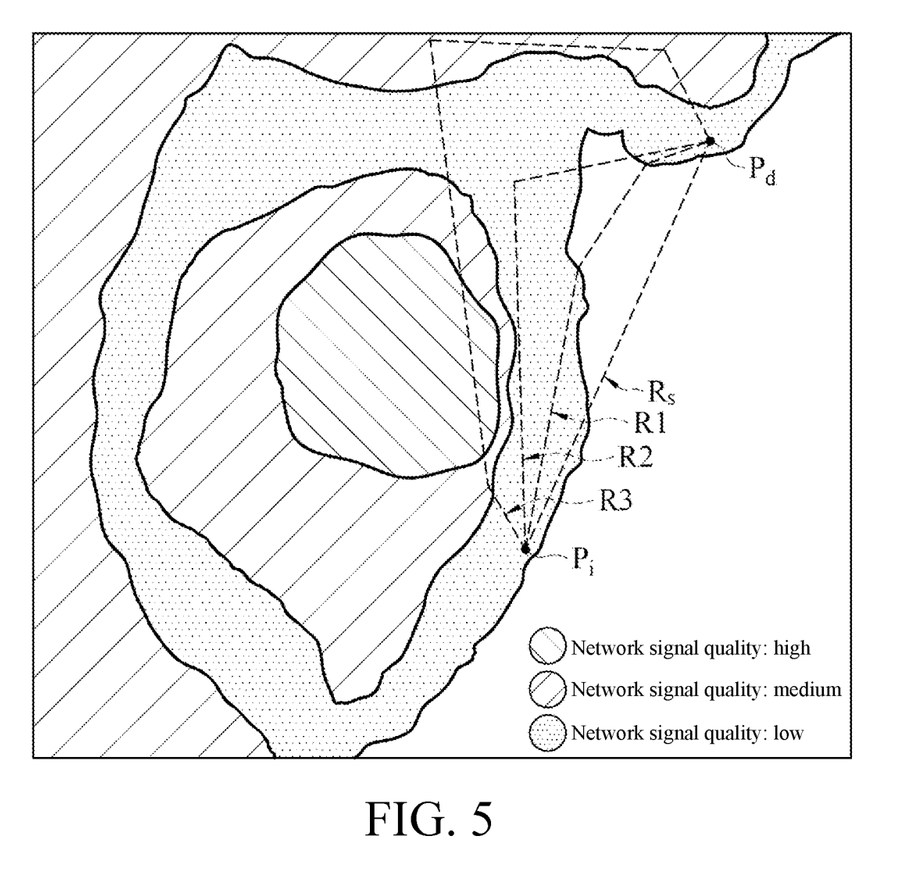
FIG. 5 is a flight route planning diagram according to an embodiment of the present disclosure.

Referring to FIG. 2, FIG. 4, and FIG. 5 at the same time, FIG. 4 is a flowchart of a method for providing an optimal flight route according to an embodiment of the present disclosure, and FIG. 5 is a flight route planning diagram according to an embodiment of the present disclosure. The method shown in FIG. 4 may be executed by the apparatus 2 for flight route planning for an unmanned aerial vehicle before the flight of the unmanned aerial vehicle D, or it can be executed in real time during the flight.

In step S100, the apparatus 2 for flight route planning for an unmanned aerial vehicle receives a request including a starting position Pi, an ending position Pd, and flight conditions through the input device 25. The starting position Pi is latitude and longitude coordinates at which the unmanned aerial vehicle D is scheduled to depart or real-time latitude and longitude coordinates of the unmanned aerial vehicle D, and the ending position Pd is latitude and longitude coordinates at which the unmanned aerial vehicle D is scheduled to arrive. In an embodiment, the flight conditions include a maximum mileage limit of the flight and a minimum network coverage rate. The maximum mileage limit is typically related to the battery capacity and flight duration of the unmanned aerial vehicle D. A shorter flight mileage usually implies a shorter flight duration, resulting in an earlier arrival time. Information about the network connection quality at various geographical locations can be obtained from the network coverage data provided by telecommunications companies. In this embodiment, the network coverage rate may refer to the total proportion of the total distance of a flight route that has experienced a network connection quality exceeding a certain threshold value. For example, if the network connection quality is scored on a scale of 0 to 5 (0 being no signal, and 5 being the strongest signal) and the threshold value is assumed to be 3, the proportion of one or more segments of the flight route with the score of 3 out of the total length is 40%, the proportion of one or more segments of the flight route with the score of 4 out of the total length is 30%, and the proportion of one or more segments of the flight route with the score of 5 out of the total length is 20%, then, the effective network coverage rate of this flight route is 40%+30%+20%=90% (indicating that the proportion of this flight route passing through areas with the network connection quality having a score of 3 or higher is up to 90%). However, the algorithm of the network coverage rate of a flight route is not limited to this. It may be possible to calculate the network coverage rate as the sum of proportions of the segments with scores 1 to 5 (excluding 0 for no signal) without setting a threshold value, or it may also be possible to define and calculate the network coverage rate by using other suitable algorithms. However, the fundamental basis for calculating the network coverage rate is the distribution of the network connection quality of the flight route.

In step S110, the apparatus 2 for flight route planning for an unmanned aerial vehicle applies the starting position Pi, the ending position Pd, and the flight conditions to the flight geographic data in the storage module 22 to generate a plurality of flight routes. As shown in FIG. 5, in an embodiment, four flight routes including one shortest route Rs and three candidate routes R1, R2, R3 are generated. The three candidate routes R1, R2, R3 all meet the aforementioned flight conditions, for example, a maximum mileage limit of 20 km and a network coverage rate of 50% or above.

In step S120, the apparatus 2 for flight route planning for an unmanned aerial vehicle calculates a total mileage and a network coverage rate of each of the flight routes, assigns a feature score to the total mileage and the network coverage rate of each of the flight routes respectively, and applies different weights to the feature scores to obtain a total score of each of the flight routes respectively.

In further detail, the processor 20 obtains a total mileage and a network coverage rate of each of the candidate routes R1, R2, R3 by using the flight geographic data, and assigns a feature score to the total mileage and the network coverage rate of each of the candidate routes respectively. Further, the feature score in this embodiment is calculated, for example, by setting the feature score of the total mileage of the shortest route Rs as a full score, such as 100, and obtaining the feature score of the total mileages of the three candidate routes R1, R2, R3 based on an equation $Sr=Sc*((Dr-Ds)/Ds)$, where Sr is the feature score of the total mileage of the candidate routes R1, R2, R3; Sc is the full score; Dr is the total mileage of the candidate routes R1, R2, R3; and Ds is the total mileage of the shortest route Rs. On the other hand, the feature score of the network coverage rate in this embodiment is calculated, for example, by multiplying the network coverage rate of the shortest route Rs and the three candidate routes R1, R2, R3 respectively by the full score (the full score in this embodiment is 100).

Next, a route weight is applied to the feature scores of the total mileages of the shortest route Rs and the three candidate routes R1, R2, R3, thereby respectively obtaining a route weighted feature score for each flight route. In an embodiment, the route weight is set to 0.2. Similarly, a network weight is applied to the feature scores of the network coverage rates of the shortest route Rs and the three candidate routes R1, R2, R3, thereby respectively obtaining a network weighted feature score for each flight route. In an embodiment, the network weight is set to 0.8. Finally, the route weighted feature score and the network weighted feature score of each flight route are summed up to respectively obtain a total score of each flight route. In this embodiment, the route weight and the network weight are defaulted to 2:8 (i.e., 0.2 and 0.8). However, in other embodiments of the present disclosure, the route weight and the network weight may also be 3:7 or even 5:5, which depends on whether the user prioritizes the length of the route or the stability of the network quality in actual operation. However, the method for calculating the total score of the flight route of the present disclosure is not limited to the weighting and summing described above. In other embodiments, the total score may be calculated by using a specific mathematical relationship between the feature score of the total mileage and the feature score of the network coverage rate, which could include additional factors such as other flight conditions or weather-related influences.

Table 1 below lists the feature scores of the total mileages, the route weighted feature scores, the feature scores of the network coverage rates, and the network weighted feature scores of the shortest routes Rs and the three candidate routes R1, R2, R3. In the embodiment of Table 1 below, the total mileage of the shortest route Rs is 10 km, but the network coverage rate is only 30%. The total mileage of the candidate route R1 is 13 km, and the network coverage rate is 75%. The total mileage of the candidate route R2 is 15 km, and the network coverage rate is 90%. The total mileage of the candidate route R3 is 20 km, and the network coverage rate is 100%.

TABLE 1

|  | Feature score of total mileage | Route weighted feature score | Feature score of network coverage rate | Network weighted feature score | Total score |
|---|---|---|---|---|---|
| Shortest route Rs | 100 | 20 | 30 | 24 | 44 |
| Candidate route R1 | 70 | 14 | 75 | 60 | 74 |
| Candidate route R2 | 50 | 10 | 90 | 72 | 82 |
| Candidate route R3 | 0 | 0 | 100 | 80 | 80 |

Finally, in step S130, the apparatus 2 for flight route planning for an unmanned aerial vehicle outputs the optimal flight route as a preset flight route. The optimal flight route is the flight route with the highest total score selected from all the flight routes. In the embodiment of Table 1, the processor 20 compares the total scores of all the flight routes, selects the candidate route R2 with the highest total score as the optimal flight route, and outputs the optimal flight route to the output device 24, which is displayed, for example, on a display or transmitted to the unmanned aerial vehicle D via the wireless communication module 21. However, the preset flight route may only be a preferred recommendation rather than a final decision. For example, in other embodiments of the present disclosure, other flight routes with higher scores may be selected by adding or referring to other flight conditions (e.g., no-fly areas) or other on-site factor considerations (e.g., weather conditions).

In addition, FIG. 5 shows areas with different network signal qualities. In other embodiments, in terms of the flight conditions, in addition to the network coverage rate, the network signal quality may also be set. For example, the coverage rate of medium or above network signal quality should be at least 60%, which may be presented as the candidate route R3.

Figure 6:
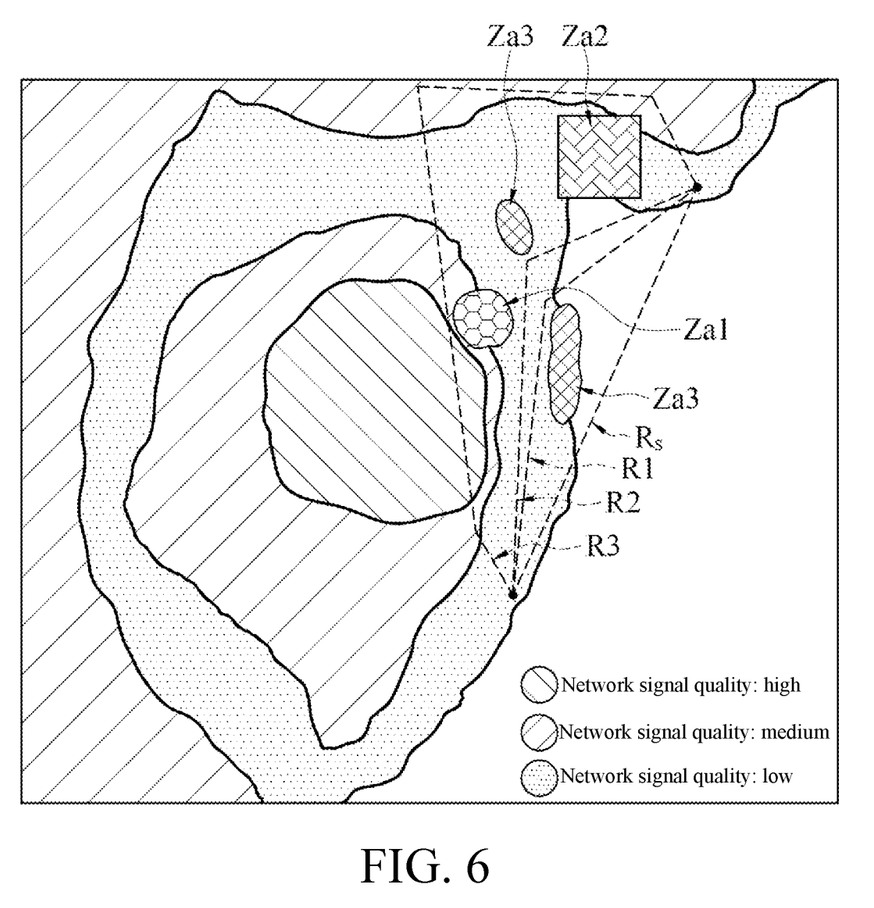
FIG. 6 is a flight route planning diagram according to another embodiment of the present disclosure.

Referring to FIG. 6, which is a flight route planning diagram according to another embodiment of the present disclosure. This embodiment is different from the foregoing embodiment mainly in additional flight conditions. In further detail, it's important to consider hotspot areas where network congestion can occur even in areas with network coverage. Besides, there might be situations where network quality is temporarily poor or even disrupted in certain areas due to unexpected events or accidents, which may not align with the network coverage information provided by the original telecommunication providers. This situation also needs to be taken into account.

Accordingly, in an embodiment, a flight avoidance area may be included in the flight conditions. The flight avoidance area means the area that should be avoided when planning flight routes, such as a network congestion area Za1, a no-fly area Za2, and an actual poor network quality area Za3. The network congestion area Za1 is an area where the network quality is degraded due to a large number of network users, which can be implemented by receiving and analyzing historical network quality information through a data-mining engine, for example, by receiving real-time network quality information published by telecommunications system operators, and crowd or traffic information provided by mobile phone software operators (such as Google). In some areas, network congestion may only occur during certain time periods, such as from 8 AM to 10 AM, so conditions associated with the network congestion area Za1 may also include information on the corresponding time.

The no-fly area Za2 may be, for example, a military base, an airport, a government building, a medical or utility facility e.g., a power plant, a landmark, and other government or private properties; and can be described by height restrictions, bounding boxes, geofences, and special labels defined by using various coordinate systems. In some areas, no-fly restrictions may be applicable only during certain time periods (for example, 7 PM to 7 AM), so conditions associated with the no-fly area Za2 may also include information regarding the corresponding time of restriction for the restricted area.

The actual poor network quality area Za3 may be implemented by analyzing or making statistics on historical flight records. For example, according to the recent flight records of the unmanned aerial vehicle, the network quality in a specific area is not as good as the coverage network information published by telecommunications operators. This discrepancy may be due to factors such as natural disasters or unforeseen event causing failures in local base stations. In an embodiment, the unmanned aerial vehicle may obtain network quality monitoring data of the entire flight route by means of a sensor (a network quality detector). When a specific area with poor network quality is found in the recent flight records, and it is inconsistent with the coverage network information provided by the telecommunications operators, this area may be identified as the actual poor network quality area Za3. Therefore, in an embodiment, the actual poor network quality area Za3 may be included in the flight avoidance area based on the historical signal quality statistics of flight routes.

In addition, in other embodiments, the flight avoidance area may also include other environmental or human factors, for example, extreme weather conditions such as strong winds or storms, bird strikes, human attacks, and heavy flight traffic. However, these factors or events may be implemented through the analysis or statistical evaluation of historical flight records or other relevant flight information.

Referring to FIG. 4 and FIG. 6, in step S100, the flight avoidance area such as the network congestion area Za1, the no-fly area Za2, and the actual poor network quality area Za3, may be included when setting the flight conditions. In step S110, the flight routes generated by the system are flight routes that avoid these areas or that selected to do not pass through these areas.

Based on the above, in some embodiments, users only need to input the starting position and the ending position and set the flight conditions according to actual needs, such as the maximum mileage limit, the minimum network coverage rate, and the flight avoidance area. The apparatus or the method of the present disclosure can automatically plan a plurality of flight routes, evaluate the flight routes according to the set calculation rules and weights, and output the optimal flight route to the unmanned aerial vehicle. The optimal flight route can not only achieve an excellent balance between the network coverage rate and the mileage, but also avoid the flight avoidance areas including the network congestion area, the poor signal area, and the no-fly area, thus providing a safe, reliable, and fast flight route for the unmanned aerial vehicle.

For implementations involving firmware and/or software, the methods may be implemented by performing the functions or steps described herein. Any machine-readable medium capable of implementing the instructions of the methods described herein may be used to implement the methods described herein. For example, software program codes may be stored in a memory and executed by a processor. If implemented in firmware or software, these functions may be stored on a computer-readable storage medium as one or more instructions or program codes. The computer-readable medium may include a RAM, a ROM, an electrically erasable programmable read-only memory (EEPROM), a compact disc read-only memory (CD-ROM) or other optical disk storage, magnetic disk storage, semiconductor storage or other storage device, or any other media that can be used to store the required program codes in the form of instructions or data structures and can be accessed by a computer.

Although the present disclosure has been described in considerable detail with reference to certain preferred embodiments thereof, the disclosure is not for limiting the scope of the invention. Persons having ordinary skill in the art may make various modifications and changes without departing from the scope and spirit of the disclosure. Therefore, the scope of the appended claims should not be limited to the description of the preferred embodiments described above.

What is claimed is:

1. A method for flight route planning for an aerial vehicle, executed by a processor of a flight route planning apparatus communicatively coupled to the aerial vehicle, comprising the following steps:
   receiving, via a wireless communication module, a request comprising a starting position and an ending position;

retrieving flight geographic data, including network coverage data and terrain data, from a storage module;

generating, by the processor, a plurality of candidate flight routes from the starting position to the ending position;

for each of the candidate flight routes, performing, by the processor, steps of:

calculating a total mileage based on geographic distance;

determining a network coverage rate based on the network coverage data;

assigning a feature score to each of the total mileage and the network coverage rate; and calculating a total score by applying a weighted sum to the feature scores for the total mileage and the network coverage rate;

selecting, by the processor and based on the total scores, an optimal flight route, wherein the optimal flight route is a flight route with a highest total score among the candidate flight routes; and outputting the optimal flight route to the aerial vehicle via the wireless communication module;

wherein the aerial vehicle is configured to fly along the optimal flight route while collecting real-time network quality data using an onboard network quality detector.

2. The method for flight route planning for an aerial vehicle according to claim 1, wherein the request further comprises at least one flight condition, and wherein the step of generating the plurality of candidate flight routes is further based on the at least one flight condition, the at least one flight condition comprising at least one of a maximum mileage limit, and a minimum network coverage rate.

3. The method for flight route planning for an aerial vehicle according to claim 2, wherein the at least one flight condition further comprises a flight avoidance area; the flight avoidance area is selected from one or more of: a network congestion area, a no-fly area, or an actual poor network quality area; and the actual poor network quality area is obtained from at least one historical flight record.

4. The method for flight route planning for an aerial vehicle according to claim 3, wherein the flight geographic data comprises latitude and longitude coordinates, and the flight avoidance area.

5. The method for flight route planning for an aerial vehicle according to claim 1, wherein the step of calculating the total score comprises: applying a route weight to the feature scores of the total mileages of the candidate flight routes respectively to obtain a plurality of route weighted feature scores; applying a network weight to the feature scores of the network coverage rates of the candidate flight routes respectively to obtain a plurality of network weighted feature scores; and summing up the route weighted feature score and the network weighted feature score of each of the candidate flight routes to obtain the total score of each of the candidate flight routes respectively.

6. The method for flight route planning for an aerial vehicle according to claim 5, wherein the network weight is greater than the route weight.

7. The method for flight route planning for an aerial vehicle according to claim 5, wherein the candidate flight routes comprise a shortest route, and wherein the step of assigning a feature score comprises: assigning a full score as the feature score for the total mileage of the shortest route; and calculating the feature score for the total mileage of each of the other candidate flight routes according to an equation $Sr=Sc*((Dr-Ds)/Ds)$, wherein Sr is the feature score of the total mileage of the other candidate route, Sc is the full score, Dr is the total mileage of the other candidate route, and Ds is the total mileage of the shortest route.

8. The method for flight route planning for an aerial vehicle according to claim 7, wherein the step of assigning a feature score further comprises calculating the feature score for the network coverage rates of each of the candidate flight routes by multiplying the respective network coverage rate by the full score.

9. An apparatus for flight route planning for an aerial vehicle, the apparatus comprising:

a wireless communication module, configured to be communicatively coupled to the aerial vehicle;

a storage module, configured to store flight geographic data including network coverage data and terrain data; and a processor, electrically coupled to the wireless communication module and the storage module, and configured to execute instructions to perform the following operations:

receiving, via the wireless communication module, a request comprising a starting position and an ending position;

retrieving the flight geographic data from the storage module;

generating a plurality of candidate flight routes from the starting position to the ending position;

for each of the candidate flight routes, performing steps of:

calculating a total mileage based on geographic distance;

determining a network coverage rate based on the network coverage data;

assigning a feature score to each of the total mileage and the network coverage rate;

calculating a total score by applying a weighted sum to the feature scores for the total mileage and the network coverage rate;

selecting, by the processor and based on the total scores, an optimal flight route, wherein the optimal flight route is a flight route with a highest total score among the candidate flight routes; and outputting the optimal flight route to the aerial vehicle via the wireless communication module;

wherein the aerial vehicle is configured to fly along the optimal flight route while collecting real-time network quality data using an onboard network quality detector.

10. The apparatus for flight route planning for an aerial vehicle according to claim 9, wherein the request further comprises at least one flight condition, and wherein the operation of generating the plurality of candidate flight routes is further based on the at least one flight condition, the at least one flight condition comprising at least one of a maximum mileage limit and a minimum network coverage rate.

11. The apparatus for flight route planning for an aerial vehicle according to claim 10, wherein the at least one flight condition further comprises a flight avoidance area; the flight avoidance area is selected from one or more of: a network congestion area, a no-fly area, or an actual poor network quality area; and the actual poor network quality area is obtained from at least one historical flight record.

12. The apparatus for flight route planning for an aerial vehicle according to claim 11, wherein the flight geographic data comprises latitude and longitude coordinates, and the flight avoidance area.

13. The apparatus for flight route planning for an aerial vehicle according to claim 9, wherein the operation of calculating a total score comprises: applying a route weight to the feature scores of the total mileages of the candidate flight routes respectively to obtain a plurality of route weighted feature scores; applying a network weight to the feature scores of the network coverage rates of the candidate flight routes respectively to obtain a plurality of network weighted feature scores; and summing up the route weighted feature score and the network weighted feature score of each of the candidate flight routes to obtain the total score of each of the candidate flight routes respectively.

14. The apparatus for flight route planning for an aerial vehicle according to claim 13, wherein the network weight is greater than the route weight.

15. The apparatus for flight route planning for an aerial vehicle according to claim 13, wherein the candidate flight routes comprise a shortest route, and wherein the operation of assigning a feature score comprises: assigning a full score as the feature score for the total mileage of the shortest route; and calculating the feature score for the total mileage of each of the other candidate flight routes according to an equation $Sr=Sc*((Dr-Ds)/Ds)$, wherein Sr is the feature score of the total mileage of the other candidate route, Sc is the full score, Dr is the total mileage of the other candidate route, and Ds is the total mileage of the shortest route.

16. The apparatus for flight route planning for an aerial vehicle according to claim 15, wherein the operation of assigning a feature score further comprises calculating the feature score for the network coverage rates of each of the candidate flight routes by multiplying the respective network coverage rates by the full score.

17. A non-transitory computer-readable storage medium, storing instructions that, when executed by a processor, causing the processor to perform operations for flight route planning for an aerial vehicle, the operations comprising:
  receiving, via a wireless communication module, a request comprising a starting position and an ending position;
  retrieving flight geographic data, including network coverage data and terrain data, from a storage module;
  generating a plurality of candidate flight routes from the starting position to the ending position;
  for each of the candidate flight routes, performing steps of:
  calculating a total mileage based on geographic distance;
  determining a network coverage rate based on the network coverage data;
  assigning a feature score to each of the total mileage and the network coverage rate of; and
  calculating a total score by applying a weighted sum of the feature scores for the total mileage and the network coverage rate;
  selecting, based on the total scores, an optimal flight route, wherein the optimal flight route is a flight route with a highest total score among the candidate flight routes; and
  outputting the optimal flight route to the aerial vehicle via the wireless communication module;
  wherein the aerial vehicle is configured to fly along the optimal flight route while collecting real-time network quality data using an onboard network quality detector.

18. The non-transitory computer-readable storage medium according to claim 17, wherein the request further comprises at least one flight condition, and wherein the operation of generating the plurality of candidate flight routes is further based on the at least one flight condition; the at least one flight condition is selected from one or more of: a maximum mileage limit, a minimum network coverage rate, or a flight avoidance area; the flight avoidance area is selected from one or more of: a network congestion area, a no-fly area, or an actual poor network quality area; and the actual poor network quality area is obtained from at least one historical flight record.

19. The non-transitory computer-readable storage medium according to claim 17, wherein the operation of calculating a total score comprises: applying a route weight to the feature scores of the total mileages of the candidate flight routes respectively to obtain a plurality of route weighted feature scores; applying a network weight to the feature scores of the network coverage rates of the candidate flight routes respectively to obtain a plurality of network weighted feature scores; and summing up the route weighted feature score and the network weighted feature score of each of the candidate flight routes to obtain the total score of each of the candidate flight routes respectively; wherein the network weight is greater than the route weight.

20. The non-transitory computer-readable storage medium according to claim 19, wherein the candidate flight routes comprise a shortest route, and wherein the operation of assigning a feature score comprises: assigning a full score as the feature score for the total mileage of the shortest route; and calculating the feature score for the total mileage of each of the other candidate flight routes according to an equation $Sr=Sc*((Dr-Ds)/Ds)$, wherein Sr is the feature score of the total mileage of the other candidate route, Sc is the full score, Dr is the total mileage of the other candidate route, and Ds is the total mileage of the shortest route; and calculating the feature score for the network coverage rates of each of the candidate flight routes by multiplying the respective network coverage rates by the full score.

* * * * *

UNITED STATES PATENT AND TRADEMARK OFFICE
CERTIFICATE OF CORRECTION

| | | |
|---|---|---|
| PATENT NO. | : 12,451,020 B2 | Page 1 of 1 |
| APPLICATION NO. | : 18/498281 | |
| DATED | : October 21, 2025 | |
| INVENTOR(S) | : Shao-Kang Chen | |

It is certified that error appears in the above-identified patent and that said Letters Patent is hereby corrected as shown below:

In the Claims

In Column 11, Line 26 (in Claim 16) – please delete "rates" and substitute therefor --rate--
In Column 11, Line 45 (in Claim 17) – immediately following "rate", please delete "of"
In Column 12, Line 46 (in Claim 20) – immediately following "coverage", please delete "rates" and substitute therefor --rate--

Signed and Sealed this
Thirtieth Day of December, 2025

John A. Squires
*Director of the United States Patent and Trademark Office*